US011518380B2

(12) United States Patent
Kuehnle et al.

(10) Patent No.: US 11,518,380 B2
(45) Date of Patent: Dec. 6, 2022

(54) SYSTEM AND METHOD FOR PREDICTED VEHICLE INCIDENT WARNING AND EVASION

(71) Applicant: Bendix Commercial Vehicle Systems LLC, Elyria, OH (US)

(72) Inventors: Andreas U. Kuehnle, Villa Park, CA (US); Shaun Michael Howard, Irvine, CA (US)

(73) Assignee: Bendix Commercial Vehicle Systems, LLC, Avon, OH (US)

( * ) Notice: Subject to any disclaimer, the term of this patent is extended or adjusted under 35 U.S.C. 154(b) by 205 days.

(21) Appl. No.: 16/129,464

(22) Filed: Sep. 12, 2018

(65) Prior Publication Data

US 2020/0079369 A1 Mar. 12, 2020

(51) Int. Cl.
*B60W 30/095* (2012.01)
*B60W 30/085* (2012.01)
(Continued)

(52) U.S. Cl.
CPC ...... *B60W 30/0953* (2013.01); *B60W 30/085* (2013.01); *B60W 50/16* (2013.01);
(Continued)

(58) Field of Classification Search
CPC ........... B60W 30/0953; B60W 30/085; B60W 50/16; B60W 2554/00; B60W 2050/146; B60W 2540/26; B60W 2540/30; G06K 9/00805; G06K 2009/00738; G06K 9/00798; G06N 3/08
See application file for complete search history.

(56) References Cited

U.S. PATENT DOCUMENTS

| 7,317,406 B2 | 1/2008 | Wolterman |
| 7,348,895 B2 | 3/2008 | Lagassey |

(Continued)

FOREIGN PATENT DOCUMENTS

| CN | 106297340 A | 1/2017 |
| CN | 106507315 A | 3/2017 |

(Continued)

OTHER PUBLICATIONS

PCT/US19/50005, International Search Report (PCT/ISA/210 and PCT/ISA/220) dated Nov. 21, 2019, enclosing Written Opinion of the International Searching Authority (PCT/ISA/237) (Fourteen (14) pages).

(Continued)

*Primary Examiner* — Behrang Badii
*Assistant Examiner* — Jalal C Coduroglu
(74) *Attorney, Agent, or Firm* — Crowell & Moring LLP

(57) ABSTRACT

An in-vehicle data collection and processing device receives real-time data from a plurality of sensors relating to at least one of a current vehicle condition and a current driver condition. The device then predicts, by processing at least a portion of the real-time data through a pre-trained pattern recognition algorithm, a likelihood of occurrence of at least one of a plurality of incidents involving the vehicle. In response, the device outputs one or more types of warnings and/or conducts a vehicle evasive maneuver if the likelihood is predicted to be above one or more thresholds.

16 Claims, 6 Drawing Sheets

(51) Int. Cl.
  *B60W 50/16* (2020.01)
  *G06N 3/08* (2006.01)
  *G06V 20/58* (2022.01)
  *B60W 50/14* (2020.01)
(52) U.S. Cl.
  CPC .............. *G06N 3/08* (2013.01); *G06V 20/58* (2022.01); *B60W 2050/146* (2013.01); *B60W 2540/26* (2013.01); *B60W 2540/30* (2013.01); *B60W 2554/00* (2020.02)

(56) References Cited

U.S. PATENT DOCUMENTS

| | | | | |
|---|---|---|---|---|
| 8,823,799 | B2 * | 9/2014 | Kuehnle | G06K 9/00825 |
| | | | | 348/149 |
| 9,058,524 | B2 * | 6/2015 | Kuehnle | G06K 9/00805 |
| 9,102,220 | B2 * | 8/2015 | Breed | B60N 2/2806 |
| 9,342,747 | B2 * | 5/2016 | Kuehnle | B60R 1/00 |
| 9,495,609 | B2 * | 11/2016 | Kuehnle | G06K 9/4604 |
| 9,754,163 | B2 * | 9/2017 | Segalovitz | G06K 9/4676 |
| 9,764,736 | B2 * | 9/2017 | Prokhorov | B60W 10/20 |
| 9,820,658 | B2 * | 11/2017 | Tran | A61B 5/4839 |
| 9,849,364 | B2 * | 12/2017 | Tran | A63B 69/36 |
| 9,911,290 | B1 * | 3/2018 | Zalewski | G06Q 20/12 |
| 9,928,418 | B2 * | 3/2018 | Segalovitz | G06K 9/4628 |
| 9,990,550 | B2 * | 6/2018 | Kuehnle | G06K 9/00805 |
| 9,992,641 | B2 * | 6/2018 | Lee | G06K 9/00302 |
| 10,022,613 | B2 * | 7/2018 | Tran | G06F 3/011 |
| 10,022,614 | B1 * | 7/2018 | Tran | G16H 50/70 |
| 10,034,066 | B2 * | 7/2018 | Tran | G06K 9/00355 |
| 10,046,228 | B2 * | 8/2018 | Tran | H04L 9/3236 |
| 10,046,229 | B2 * | 8/2018 | Tran | B33Y 10/00 |
| 10,052,026 | B1 * | 8/2018 | Tran | A61B 5/742 |
| 10,055,643 | B2 * | 8/2018 | Molin | H04N 5/225 |
| 10,089,538 | B2 * | 10/2018 | Molin | H04N 5/247 |
| 2005/0273218 | A1 * | 12/2005 | Breed | G07C 5/085 |
| | | | | 701/2 |
| 2008/0195261 | A1 * | 8/2008 | Breed | B60R 11/0241 |
| | | | | 701/2 |
| 2009/0033540 | A1 * | 2/2009 | Breed | G06V 20/58 |
| | | | | 701/472 |
| 2009/0040054 | A1 * | 2/2009 | Wang | G06V 20/597 |
| | | | | 340/576 |
| 2009/0089108 | A1 | 4/2009 | Angell et al. | |
| 2012/0036016 | A1 * | 2/2012 | Hoffberg | H04N 21/47 |
| | | | | 455/457 |
| 2012/0212353 | A1 * | 8/2012 | Fung | B60W 10/20 |
| | | | | 701/1 |
| 2015/0142209 | A1 * | 5/2015 | Breed | G08G 1/096716 |
| | | | | 701/1 |
| 2017/0072850 | A1 * | 3/2017 | Curtis | G08G 1/166 |
| 2017/0091617 | A1 | 3/2017 | Baughman et al. | |
| 2017/0101093 | A1 | 4/2017 | Barfield, Jr. et al. | |
| 2017/0103267 | A1 * | 4/2017 | Mishra | G06K 9/6256 |
| 2017/0113702 | A1 * | 4/2017 | Thieberger-Navon | |
| | | | | B60W 50/0097 |
| 2018/0001184 | A1 * | 1/2018 | Tran | G09B 19/0038 |
| 2018/0015918 | A1 * | 1/2018 | Bae | B60W 50/16 |
| 2018/0147645 | A1 * | 5/2018 | Boccadoro | B23Q 17/2471 |
| 2020/0079369 | A1 * | 3/2020 | Kuehnle | G06K 9/00805 |

FOREIGN PATENT DOCUMENTS

| | | | | |
|---|---|---|---|---|
| CN | 107004120 A | * | 8/2017 | ............... B60R 1/00 |
| DE | 10 2015 004 748 A1 | | 10/2016 | |
| EP | 1 657 693 A2 | | 5/2006 | |
| JP | 2015-153001 A | | 8/2015 | |
| WO | WO 2014/100720 A1 | | 6/2014 | |
| WO | WO 2014/194000 A1 | | 12/2014 | |
| WO | WO 2015/042572 A1 | | 3/2015 | |
| WO | WO-2015192239 A1 | * | 12/2015 | ........... G06K 9/6254 |

OTHER PUBLICATIONS

Chen et al., "Learning Deep Representation from Big and Heterogeneous Data for Traffic Accident Inference", Proceedings of the Thirtieth AAAI Conference on Artificial Intelligence (AAAI-16), pp. 338-344, URL:https://www.aaai.org/ocs/index.php/AAAI/AAAI16paper/viewFile/12036/11603.

International Preliminary Report on Patentability (PCT/IB/326 & PCT/IB/373) and Written Opinion (PCT/ISA/237) dated Mar. 25, 2021 (Thirteen (13) pages).

* cited by examiner

SYSTEM AND METHOD FOR PREDICTED VEHICLE INCIDENT WARNING AND EVASION

FIELD OF THE INVENTION

The invention relates to providing predicted vehicle incident warnings and/or evasive maneuvering and, more particularly, to outputting warnings and/or conducting a vehicle evasive maneuver based on the likelihood that a vehicle incident is predicted to occur.

BACKGROUND

Conventionally, driver assistance systems have been used in vehicles to warn and assist drivers based on a presently-existing state or condition, such as through the use of lane departure warning systems, distance following systems, parking assistance systems and the like. However, such prior art systems are limited in that they are solely reactive to a then-present state or condition, and therefore do not provide the driver with an advanced opportunity to be proactive in avoiding a possible future incident.

For example, one system that is solely reacting to a present state is a lane departure warning system that uses the "Time to Line Crossing" measure. This measure works by measuring the lateral velocity of a vehicle relative to the lane marking, calculating how much time is left until the line is reached (=distance remaining/lateral velocity), and warning when this time is smaller than some value (e.g., 0.5 seconds).

Another example is "brain to vehicle" technology in which a driver's brainwaves are monitored such that a vehicle is able to react between 0.2 and 0.5 seconds sooner than without such monitoring. Moreover, an electrical contact with the scalp is required for this brainwave measurement, which is a disadvantage. A typical time headway for both the lane department warning (LDW) and brain driven technologies is ~0.5 seconds.

In contrast, one aspect of the invention is to provide a much larger amount of time (e.g., multiple seconds to multiple minutes) to warn or assist the driver prior to the occurrence of an incident.

As such, there is a need in the art for a system and method for providing predicted incident warning and evasion.

SUMMARY OF THE INVENTION

In one embodiment of the invention, an in-vehicle data collection and processing device is configured to provide predicted incident warning and evasion. The device includes at least one of a plurality of sensors and a signal interface to the plurality of sensors, and a memory configured to store a plurality of instructions and a pre-trained pattern recognition algorithm. A processor, which is coupled to the plurality of sensors via the signal interface and to the memory, is configured to execute the plurality of instructions to receive real-time data from the plurality of sensors relating to at least one of a current vehicle condition and a current driver condition. The processor is also configured to execute the plurality of instructions to predict, by processing at least a portion of the real-time data through the pre-trained pattern recognition algorithm (or analogous method), a likelihood of occurrence of at least one of a plurality of incidents involving the vehicle, output a first warning type if the likelihood is predicted to be above a first threshold but not above a second threshold, and output a second warning type and/or conducting a vehicle evasive maneuver if the likelihood is predicted to be above the second threshold.

Other objects, advantages and novel features of the present invention will become apparent from the following detailed description of one or more preferred embodiments when considered in conjunction with the accompanying drawings.

DESCRIPTION OF EXEMPLARY EMBODIMENTS OF THE INVENTION

Figure 6:
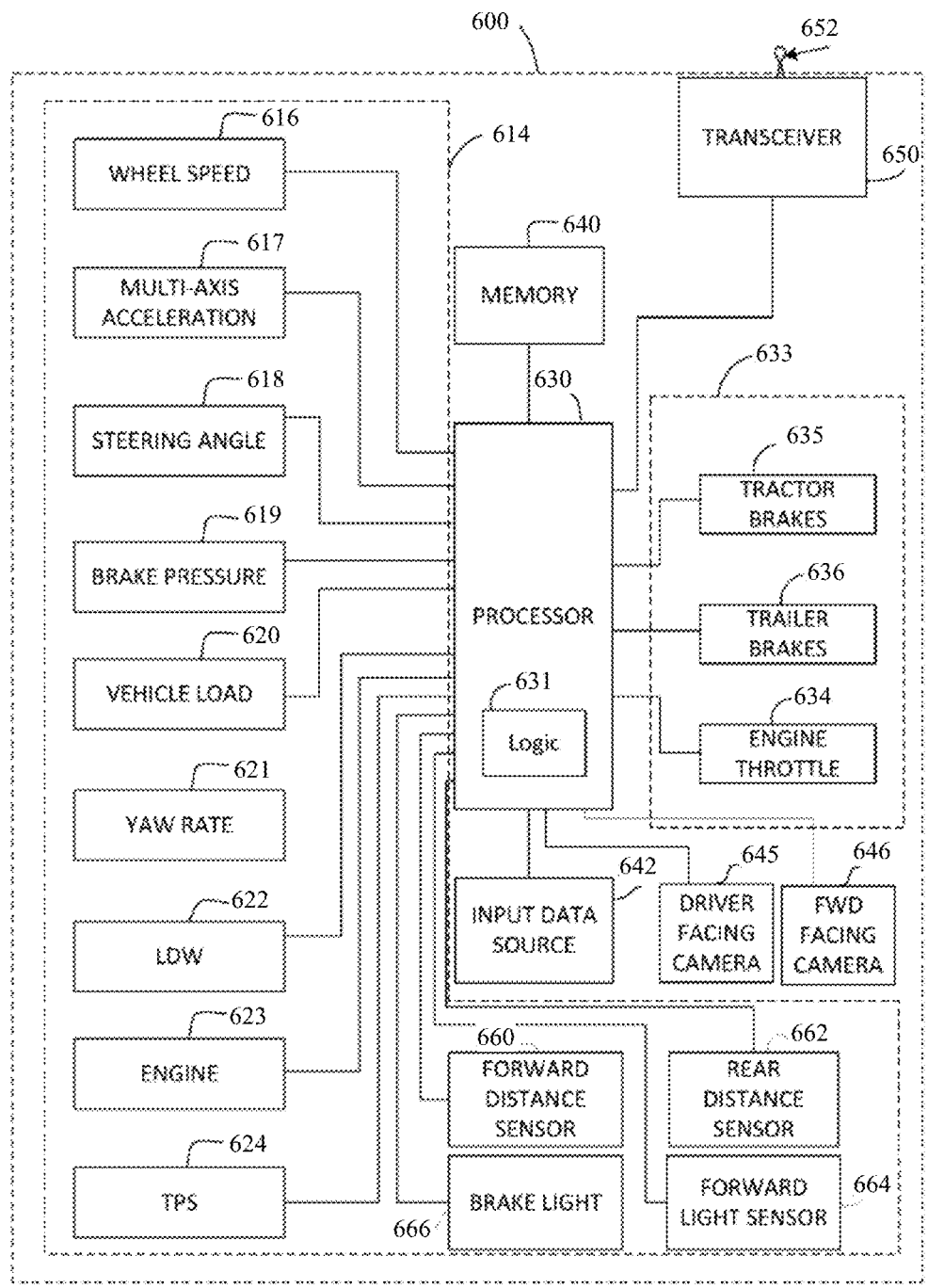
FIG. 6 is a schematic illustration of an exemplary embodiment of a predictive incident support apparatus configured to carry out one or more operations of the processes of FIGS. 1 and 5, in accordance with one or more examples of the invention.

In the example embodiment of the present invention, trucks and cars, and particularly fleet vehicles, may be configured with one or more data collection and processing devices, an example of which is described in more detail below with respect to FIG. 6, that collect information and generate data such as, in the example of a fleet of trucks, truck start, truck stop, and safety event data, wherein one such system includes for example a Lane Departure Warning system 622 (FIG. 6) that generates signals indicative of one or more events and driver and vehicle event data regarding, in the example of the fleet of trucks, truck lane wandering or lane marking crossing. Additionally, secondary systems to be described in greater detail below, also with reference to FIG. 6, are carried by the vehicles or installed in the vehicle systems, such as one or more video cameras, radar, transmission, engine, tire pressure monitoring and braking systems for example, and may generate additional data. Third-party systems that generate proprietary events or data representative of detected events may also be involved. For example, the embodiments of the present invention may include software code implementing a Bendix® Wingman® ACB system available from Bendix Commercial Vehicle Systems LLC that captures proprietary safety events and other data relating to the proprietary safety events and/or relating to the operation of the vehicle by one or more vehicle operators or drivers.

One type of collected data can be categorized as "event data," which corresponds to at least one of a plurality of predefined events, such as a lane departure, excessive braking, excessive lateral acceleration, rollover, etc. Event data may be collected over a predetermined window of time, which includes some number of seconds of data before a predefined event, or some number of seconds of data both before and after such an event. Conversely, data may be collected at predefined regular times intervals, for example, which does not otherwise correspond to any of the plurality of predefined events may be categorized as "interval data." Irregularly (random sampling) collected data is also possible. Whether regularly or irregularly collected, such interval data may correspond to data collected over a predetermined window of time.

One aspect of the invention is to relate such interval data to the occurrence or likely occurrence of events. One example of how interval data may be related to the occurrence or likely occurrence of events is in the context of driver reaction abilities which may be used to determine whether an accident may occur. If a driver reacts quickly to a given stimulus, and in the correct sense, and with the correct timing, an accident may be prevented. It is therefore of interest to measure reaction times and reaction 'size' and/or 'polarity' in response to a stimulus.

For instance, suppose a speed limit sign is passed and the vehicle is moving too quickly. The system may read the speed sign and issue a speeding warning if the legal limit is exceeded by more than some threshold (e.g., 5 mph). The pre- and post-warning speeds may then be recorded and analyzed to determine if the driver corrects to the posted speed. The length of time which elapses before a correction is made is determined, and may be taken as a measure of driver functionality.

Another example is in the context of approaching a vehicle too closely ahead, whether as a result of inattention or a vehicle cut-in. A measured reaction to this situation may be used as an analogous stimulus-response scenario. Here, the time to return from the minimum headway time to a safe value is measured.

In addition to driver reaction abilities, a second category of circumstances may be used to determine how predispose a situation is to an accident occurring. These include high noise/low signal environments. For instance, a "low sun ahead" condition can make it difficult for the driver to see. Low illumination levels or nighttime dazzling may make vision difficult. Many traffic participants or environmental elements may make it more difficult for a driver to focus on only the relevant ones. For example, shadows, particularly intermittent ones (e.g. a line of trees), may make detection of a dangerous situation more difficult, while narrow lanes may make collisions more likely.

Thus, one aspect of the invention relates to measuring driver reaction ability, reaction correctness, and various environmental factors to determine the likelihood of occurrence of an accident.

Another aspect of the invention is to make use of interval data to anticipate an event, or to associate certain detected conditions with an increased likelihood of an event occurring in the near future. By way of example, a driver may be showing signs of fatigue, with her eyes closing more and more frequently, and being closed for increasing periods of time. Once traffic is entered, a collision with a vehicle ahead may become more likely. As such, a predictive incident analysis system can be used to detect such an increased likelihood of (but not guarantee) an accident, and create a driver warning and/or undertake autonomous evasive maneuvering and/or execute driver support in response thereto.

Figure 1:
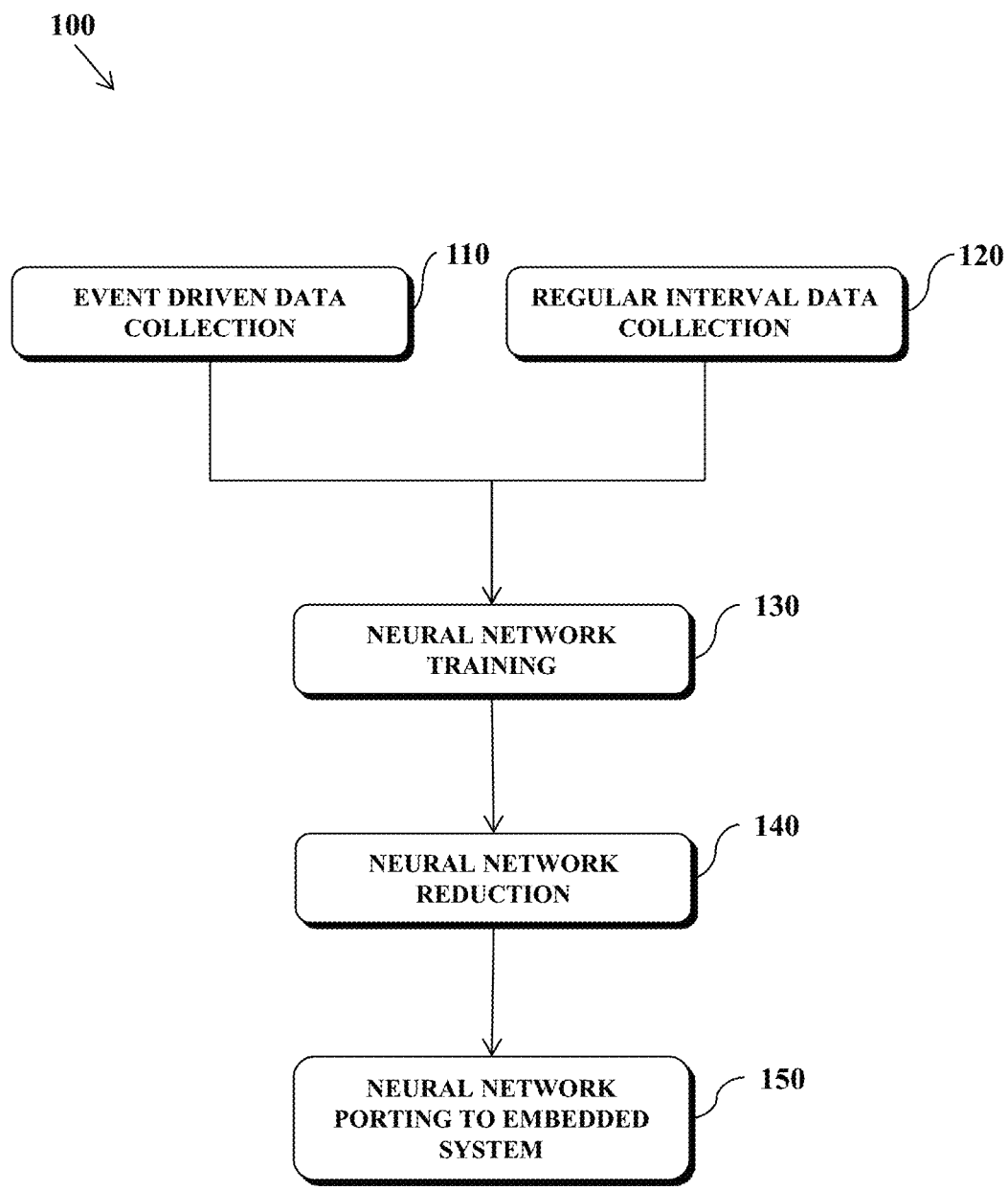
FIG. 1 is a simplified flow diagram of a process for implementing a system to provide vehicle incident warnings and/or evasions in accordance with one or more examples of the invention.

Referring now to the figures, FIG. 1 illustrates a process for implementing a system configured to provide vehicle incident warnings and/or evasions in accordance with one or more embodiments of the invention. In particular, the process 100 of FIG. 1 begins at block 110 with the collection of occurrence-triggered "event data" which, as noted above, corresponds to at least one of a plurality of predefined events, such as a lane departure, excessive braking, excessive lateral acceleration, rollover, etc. This event data may be collected using one or more vehicle-based data collection and processing devices, an example of which is described below with reference to FIG. 6. Such event data may correspond to vehicle and/or driver conditions occurring at an event occurrence time, or alternatively may correspond to a window of time leading up to, containing or surrounding an event occurrence (e.g., X second before a detected event, X second both before and after a detected event, etc.). One non-limiting example for the time length of this window may be 10 seconds before and 10 seconds after the detected event.

Figure 2:
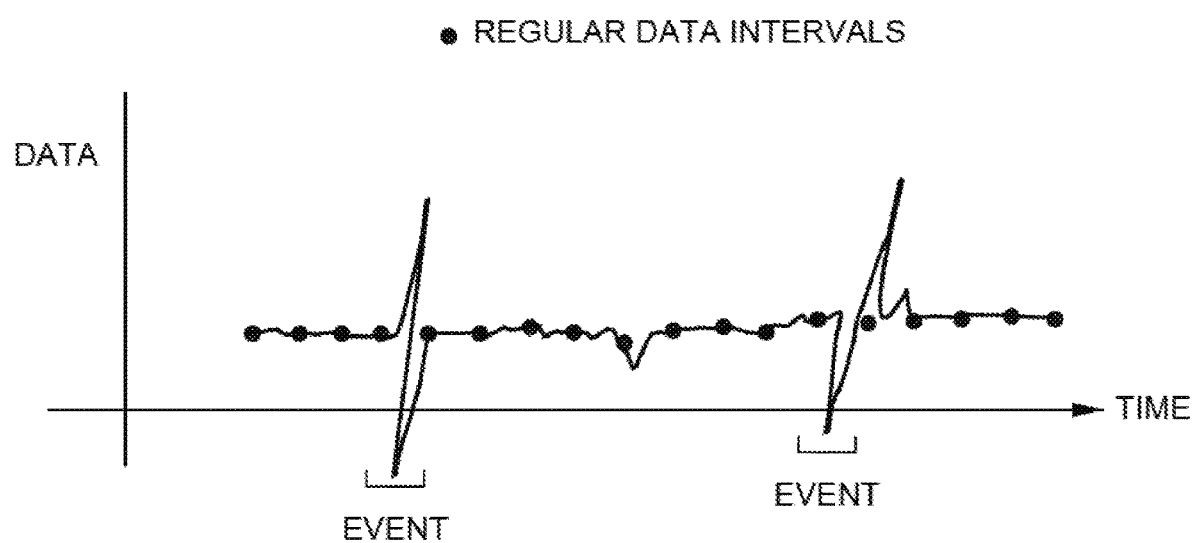
FIG. 2 depicts one example of mixed event and regularly collected data, in accordance with the principles of the invention.

In addition to collecting event data, the process 100 further separately collects interval vehicle and/or driver data (block 120), similarly using one or more vehicle-based data collection and processing devices, such as device 300 described below. Such interval data 120 may be collected at predetermined or random time intervals (e.g., every X seconds, on the average every X minutes, etc.). FIG. 2 shows one example of this mixed event and regularly collected data whereby data is collected at regular data intervals, denoted by dots plotted along the time axis, and event data is collected in a time window, indicated by square brackets, around a detected event.

In the case of either or both of event data or interval data, vehicle and driver data may be collected from across a plurality of vehicles, either from a single fleet or across disparate fleets, as well as from a plurality of drivers. Such data may be collected over hundreds or even thousands of individual vehicle runs. Such data may be based on sensor signals that are densely measured over a fixed period of time (e.g., 20 seconds) at an average or given sampling rate, such as 10 Hz, which would provide 200 times the number of measurement signals (which may include individual pixel values or analyzed images (e.g. 'it is very dark ahead'). The event and interval data may be aggregated using known big data methods, such as those known for predicting the likelihood of an item sale occurring, while, in the case of event data, the data may be optionally tagged with respect to an event type.

Figure 3:
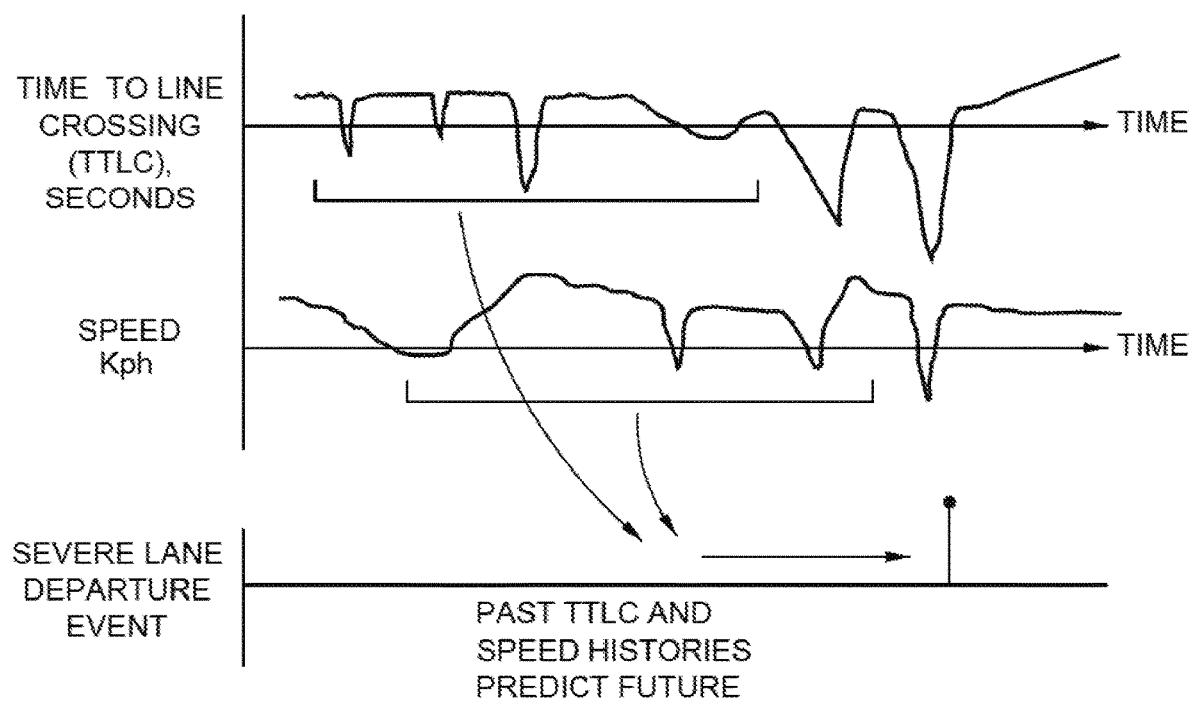
FIG. 3 depicts one embodiment of an association scheme in which the agglomeration of low time to line crossing values, together with a varying speed, can be used to predict the occurrence of a severe lane departure event.

One aspect of the invention is to use the collected event data to associate the interval data with an event occurring or not occurring, as the case may be. That is, the interval data collected at any given random time may be related to event data collected at some point in the future, with the difference between collected interval data and the future event data being a quantifiable value. In particular, the relation between the collected interval data and the future event data may be defined by a pattern recognition system (e.g. a neural network or other pattern recognition algorithm), trained with collected interval data at any given time, with the target values corresponding to the event data for an incident occurring X seconds or even minutes in the future. FIG. 3 shows such an association scheme in which the agglomeration of low time to line crossing values, together with a varying speed, predicts the occurrence of a severe lane departure event. Similar run up patterns may be used, after enough data has been collected, for other undesirable events as well.

To that end, process 100 further includes the use of the collected event data 110 and the interval data 120 to train a neural network (or other pattern recognition algorithm) at block 130, which preferably is carried out in an offline environment, such as by a backend server. In general, the neural network may be trained to recognize the relationship between input signals and an event occurring in the future, from which a probability or severity of that event actually occurring may be determined. Past (that is, before an event occurs) signal values, which may include multiple types, may be provided as inputs to a neural network. The desired output is the event type (e.g. getting too close to vehicle ahead, coded as a value, e.g. +4) or the non-occurrence of an event (coded as a value also, e.g. as +0). The network, after being presented with examples of events occurring and events not occurring, learns to associate the inputs and the outputs.

It should be appreciated that the training process of block 130 need not be run in real-time in the vehicle as discerning the predictive patterns tends to require significantly more computational power than is available in a vehicle. As such, the operation of block 130 may include collecting large quantities of data, as described above, from many vehicles, and then processing the data on powerful computers, running in a laboratory or in the cloud. These computers can use any number of known techniques to identify patterns in the data, such as by using brute force, data mining, logical programming, and/or probabilistic models.

Regardless of where or when it is performed, the neural network training of block 130 may comprise an examination that is performed over time in which interval data collected before an event is examined and related to the type of accident or event that actually follows within X second or X minutes thereafter. Negative examples (i.e., collected interval data that is not followed by an event) are equally important for creating rules and training the neural network to determine when an accident is likely or unlikely to occur. In certain embodiments, negative examples may be used to train the network to recognize slower developing events, such as accidents caused by fatigue. The negative examples may also be used to train the network to recognize when no event will occur in the future given the lack of unsafe driver activity in those examples. In combination, the positive and negative examples are used to create rules for the neural network (i.e., carry out network training of block 130) that can be used predict when accidents may happen on short and optionally longer time scales. The number of data samples given to the network may be advantageously limited by adjusting the sampling frequency, for instance, one may monitor reaction time over the last hour, measuring it every minute (60 inputs) or one may monitor reaction time in narrow road sections, such as construction sites, measuring it every second for the last minute (also 60 inputs).

In certain embodiments, another aspect of the invention is to reduce or even eliminate the need to manually label the collected data before providing it to the pattern recognition algorithm of the neural network. This is because the manner in which the data is collected inherently includes the information as to whether an event has occurred or not, (i.e., tagged as a negative or positive example), and therefore the typical manual and time-intensive task of labeling data may not be required. However, in certain embodiments it may be helpful to machine label areas of images (e.g., insert bounding boxes around objects identified by image processing) or apply logic with mathematical and/or physics-based concepts before a final rule is generated. In any event, it should be appreciated that the machine labeling of image areas or numerical vehicle data is preferably carried out as a crude, simple and fast (pre-, partially-, or coarsely-processed only) operation so that the trained neural network can be ported to a resource restricted environment, such as an in-vehicle hardware system.

In certain embodiments, a preprocessing of video data may be performed before the neural network training, e.g., before being passed to a pattern recognition algorithm. This preprocessing may include supplementing the video data with additional information. For example, in the case of an interior camera, the video data may be supplemented with additional information relating to a determined driver gaze direction relative to the road ahead, driver eye state, driver expression, hand position, etc. For video data collected from an exterior camera, the preprocessing may include supplementing the video data with information about the presence of and distance to vehicles ahead (or nearby), scene texture, recognized traffic signal and/or sign bounding boxes, etc. Such additional attributes are typically generated by on-vehicle systems, and advantageously supplement the unprocessed sensor data (e.g. forward facing camera image). The training phase of the neural network (or other classifier) may determine which preprocessing is useful and which is not, labeling certain measurements as required, others as 'get when you can', and a final set as not necessary.

Since the amount of data used to train the neural network can be very large, particularly when collected from multiple fleets of vehicles over a significant period of time, process 100 may further include a neural network reduction operation (block 140) in which the size of the neural network database may be reduced so as to be portable to a resource restricted environment, such as an in-vehicle hardware system. This is made possible by the fact that, once a pattern is identified per the process of block 130 above, not much computational power is required to detect the pattern in one or more input signals. As such, the neural network that is developed on a back-end server may be reduced to a module that can adequately run in a vehicle. Such a reduction may be carried out by eliminating unnecessary network parts (i.e., 'pruning') and compressing the remaining ones perhaps using approximations or operations that require less numerical precision. Alternatively or in addition, neural network reduction may be achieved by reducing the parameter set, reducing the number of layers, and/or by means of network binarization.

Figure 4:
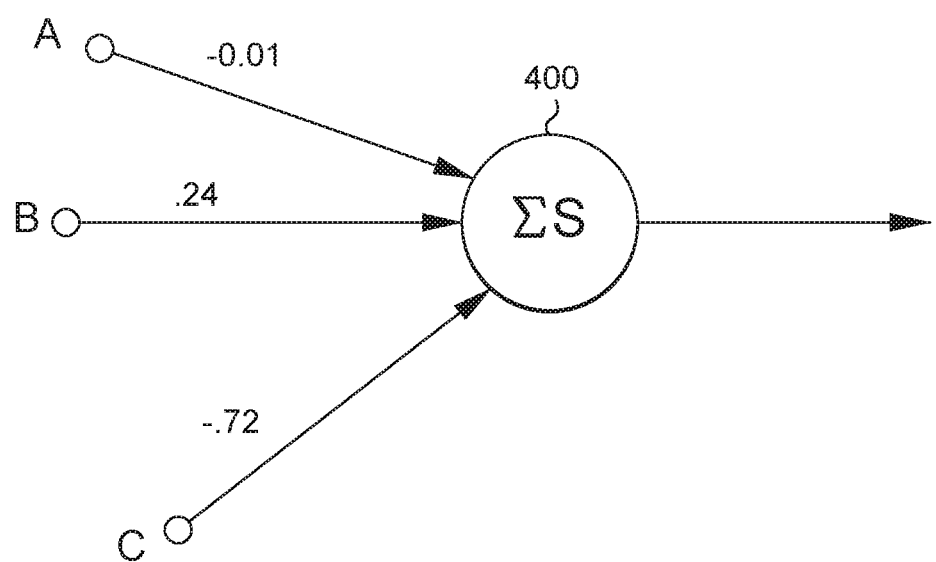
FIG. 4 illustrates one example of a neural network neuron being provided with three input signals, A, B and C, in accordance with the principles of the invention.

By way of example, consider FIG. 4 in which a neuron 400 is provided with three input signals, A, B and C. The values given to the input signals are bounded in a range, e.g. 0 to 1. The inputs may be multiplied by a weighting factor, which in the case of A is much less than either of the other two inputs. As the inputs are normalized to be between 0 and 1, this means that signal A has significantly less importance than either B or C in the resulting output. As such, signal A may be advantageously eliminated or ignored. Furthermore, both signals B and C are near to multiples of ¼, and so one may consider reducing the full floating point multiplication to bit-shifting simply multiplying by the nearby approximate values of 0.25 and 0.75 respectively, thereby reducing computational overhead. As such, in this example, the input signal A has been removed or 'pruned,' while signals B and C have been discretized and their computation made more efficient.

Referring once again to FIG. 1, process 100 continues to block 150 where the trained neural network is ported to an embedded in-vehicle hardware system, such as a data collection and processing device as described in more detail below with respect to FIG. 6. The final system then functions in the target vehicle in accordance with the process of FIG. 5, as described below.

Figure 5:
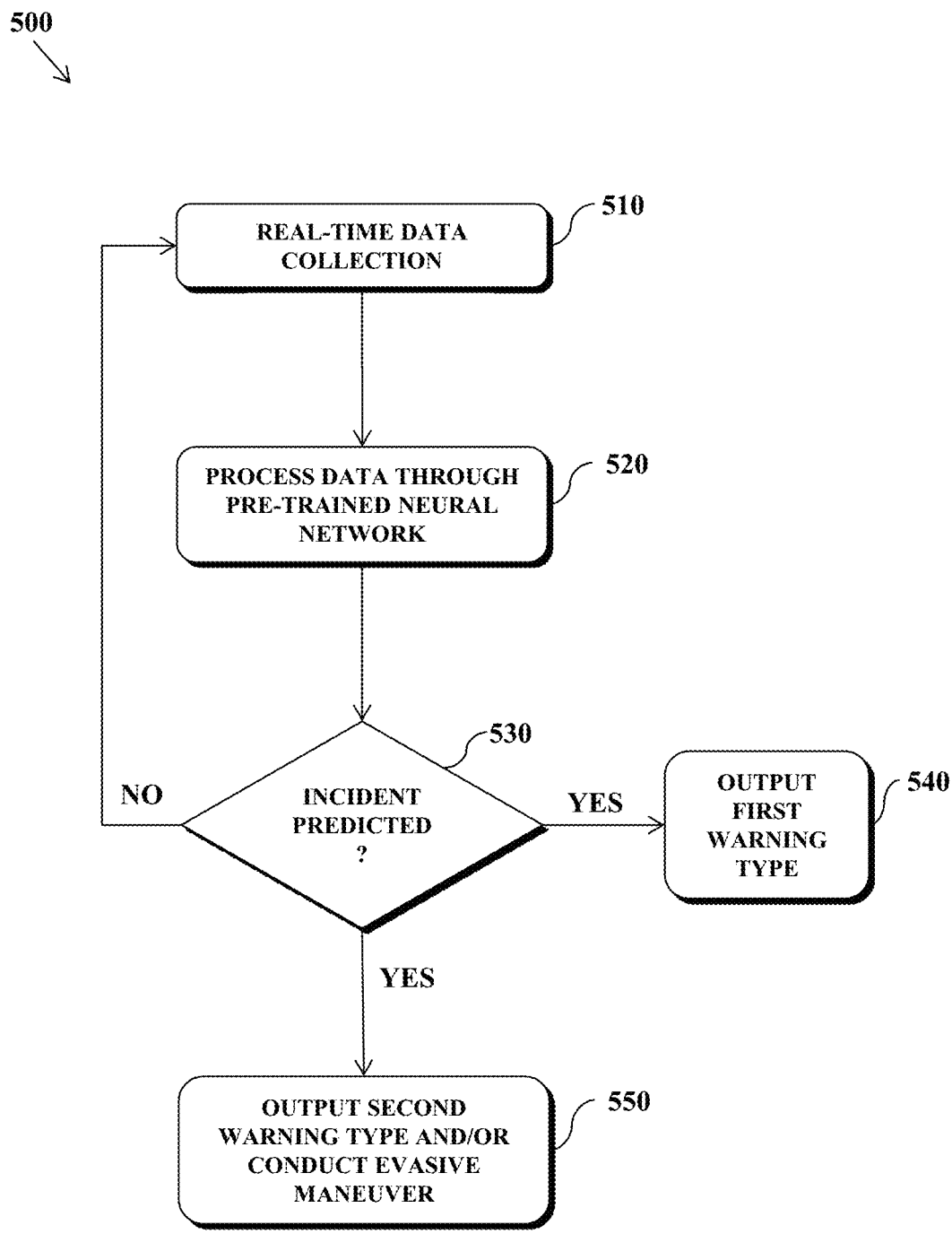
FIG. 5 is a simplified flow diagram of a process for using the system of FIG. 1 to provide vehicle incident warnings and/or evasions in accordance with one or more examples of the invention.

Referring now to FIG. 5, depicted is a process 500 for using the trained neural network of FIG. 1 to provide vehicle incident warnings and/or evasions in accordance with one or more examples of the invention. Process 500 begins at block 510 with the collection of real-time data. Such data collection may be carried out using the same or similar data collection and processing device(s) as that used in connection with the process described above with respect to FIG. 1, and an example of which is described in more detail below with respect to FIG. 6. As more particularly described below with respect to FIG. 6, such data may be collected from one or more on-vehicle sensor systems that generate real-time signals during vehicle operation indicative of one or more current vehicle and/or driver conditions. In addition, such real-time data may also involve data provided by third-party on-board systems, such as those described above.

Once collected, the real-time data is processed at block 520 through the ported trained neural network by the in-vehicle data collection and processing device(s), e.g., provided to a pattern recognition algorithm that has been pre-trained in accordance with the process of FIG. 1 and stored within a memory of the in-vehicle device. From there, the in-vehicle trained neural network determines if a predefined event or incident is predicted to be likely (e.g., above a first predetermined probability) or even very likely (e.g., above a second predetermined probability (block 530). For example, if the pre-trained neural network was trained to interpret a certain combination of conditions (e.g., a specific pattern of sensor signals and/or states) as leading to an event occurring above a first predetermined probability (e.g., 50% of the time), the process may determine at block 530 that an incident is possible when the real-time data collected at block 510 matches that known signal pattern (block 540). In such a case, a first warning type may be output to the driver at block 540. It should be appreciated that the first warning type may be associated with a relatively minor warning, such as an illuminated symbol on a display panel of the vehicle, a short audible sound from a vehicle speaker or the like. In this fashion, the driver may be sensitized to the possibility of an event of a certain type occurring, and prepare to handle or prevent such an event. The type and location of this warning may be adapted to the driver's state. For instance, if the driver is closing her eyes too frequently, perhaps an acoustic warning may be more effective, or if the driver is not scanning the environment enough, perhaps a blinking light off to the side may effectively cause the driver to better pay attention.

If, on the other hand, the real-time data collected at block 510 is determined to match a certain combination of conditions (e.g., known pattern of sensor signals and/or states) that the neural network has been trained to interpret as leading to an incident or event occurring above a second predetermined probability (e.g., 85% of the time), the process may determine at block 550 that such an incident is very likely to occur and, in response, output a second warning type and/or undertake an autonomous evasive maneuver of the vehicle. The second warning type should generally be regarded as being a more severe warning than the first warning type such that the driver understands that immediate attention and action is required. For example, the illumination of a symbol on the vehicle's control panel may be brighter or larger than in the case of the first warning type, and/or may be made to flash repeatedly on the vehicle's control patent. Similarly, an audible sound may be provided that is louder, of a longer duration and/or of a different character (e.g., more grating) than in the case of the first warning type.

With respect to conducting an autonomous evasive maneuver of block 250, the system may be configured to control a brake pedal, braking system or throttle of the motor vehicle to initiate a braking operation, perform a differential braking operation or acceleration in order to avoid or mitigate a predicted incident. The system may be further configured to control a steering wheel and/or steering system of the vehicle to similarly avoid or mitigate a predicted incident. A warning may be given before any intervention is performed.

FIG. 6 is a schematic block diagram depiction that illustrates details of a vehicle data collection and processing device, configured to carry out the method of FIG. 5, in accordance with one or more exemplary embodiments, and optionally to carry out certain aspects of the method of FIG. 1 (e.g., operations of blocks 110 and 120). According to principles of the example embodiment as illustrated, the in-vehicle data collection and processing device 600 may be adapted to detect a variety of operational parameters and conditions of the vehicle and the driver's interaction therewith and, based thereon, to predict a possible vehicle incident in order to warn the driver and/or undertake an evasive maneuver ahead of time, as may be needed or desired, for example, to maintain vehicle stability or to maintain the vehicle following distance relative to other vehicles.

In the exemplary embodiment of FIG. 6, the data collection and processing device 600 may include one or more devices or systems 614 for providing input data indicative of one or more operating parameters or one or more conditions of a commercial vehicle. Alternatively, the data collection and processing device 600 may include a signal interface for receiving signals from the one or more devices or systems 614, which may be configured separate from device 600. Such input data may comprise the aforementioned event data of block 110, interval data of block 120 and/or real-time data of block 510. For example, the devices 614 may be one or more sensors, such as but not limited to, one or more wheel speed sensors 616, one or more acceleration sensors such as multi-axis acceleration sensors 617, a steering angle sensor 618, a brake pressure sensor 619, one or more vehicle load sensors 620, a yaw rate sensor 621, a lane departure warning (LDW) sensor or system 622, one or more engine speed or condition sensors 623, and a tire pressure (TPMS) monitoring system 624. The vehicle data collection and processing device 600 may also utilize additional devices or sensors in the exemplary embodiment including for example a forward distance sensor 660 and a rear distance sensor 662 (e.g., radar, lidar, etc.). Other sensors and/or actuators or power generation devices or combinations thereof may be used of otherwise provided as well, and one or more devices or sensors may be combined into a single unit as may be necessary and/or desired.

The vehicle data collection and processing device 600 may also include a logic applying arrangement such as a controller or processor 630 and control logic 631, in communication with the one or more devices or systems 614. The processor 630 may include one or more inputs for receiving input data from the devices or systems 614. The processor 630 may be adapted to process the input data and compare the raw or processed input data to one or more stored threshold values, or to process the input data and compare the raw or processed input data to one or more circumstance-dependent desired value (e.g., to perform the operations of block 520 of FIG. 5).

The processor 630 may also include one or more outputs for delivering a control signal to one or more vehicle systems 633 based on the comparison (e.g., to perform the operations of blocks 530-550 of FIG. 5). The control signal may instruct the systems 633 to provide one or more types of driver warnings and/or to intervene in the operation of the vehicle to initiate corrective action, as described above with respect to blocks 540 and 550 of FIG. 5. For example, the processor 630 may generate and send the control signal to an engine electronic control unit or an actuating device to reduce the engine throttle 634 and slow the vehicle down. Further, the processor 630 may send the control signal to one or more vehicle brake systems 635, 636 to selectively engage the brakes (e.g., a differential braking operation). A variety of corrective actions may be possible and multiple corrective actions may be initiated at the same time.

The controller 600 may also include a memory portion 640 for storing and accessing system information, such as for example the system control logic 631 and the trained neural network described above. The memory portion 640, however, may be separate from the processor 630. The sensors 614 and processor 630 may be part of a preexisting system or use components of a preexisting system.

The data collection and processing device 600 may also include a source of input data 642 indicative of a configuration/condition of a commercial vehicle. The processor 630 may sense or estimate the configuration/condition of the vehicle based on the input data, and may select a control tuning mode or sensitivity based on the vehicle configuration/condition. The processor 630 may compare the operational data received from the sensors or systems 614 to the information provided by the tuning.

In addition, the controller 600 is operatively coupled with one or more driver facing imaging devices shown in the example embodiment for simplicity and ease of illustration as a single driver facing camera 645 representation of one or more physical video cameras disposed on the vehicle such as, for example, a video camera on each corner of the vehicle, one or more cameras mounted remotely and in operative communication with the controller 630 such as a forward facing camera 646 disposed on the vehicle in a manner to record images of the roadway ahead of the vehicle, or, as in the example embodiment, in the cab of a commercial vehicle trained on the driver and/or trained on the interior of the cab of the commercial vehicle. In the example embodiments, driver behavior data can be collected directly using the driver facing camera 645 in accordance with a detected driver head position, hand position, or the like, within the vehicle being operated by the vehicle. Such data can be collected as part of the event data of block 110, the interval data of block 120, and/or the real-time data of block 510.

In further example embodiments, the driver behavior data is collected directly using the driver facing camera 645 in accordance with a detected head pose of the driver. For purposes of this description of the example embodiments and for ease of reference, "head pose" is that set of angles describing the orientation of the driver's head, that is, pitch (driver looking down or up), yaw (driver looking left or right), and roll (driver tilting his/her head to the left or right).

Still yet further, the controller 600 may also include a transmitter/receiver (transceiver) module 650 such as, for example, a radio frequency (RF) transmitter including one or more antennas 652 for wireless communication of the automated deceleration requests, GPS data, one or more various vehicle configuration and/or condition data, or the like between the vehicles and one or more destinations such as, for example, to one or more wireless services (not shown) having a corresponding receiver and antenna. The transmitter/receiver (transceiver) module 650 may include various functional parts of sub portions operatively coupled with the platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 630 is operative to combine selected ones of the collected signals from the sensor systems described above into processed data representative of higher level vehicle condition data such as, for example, data from the multi-axis acceleration sensors 617 may be combined with the data from the steering angle sensor 618 to determine excessive curve speed event data. Other hybrid event data relatable to the vehicle and driver of the vehicle and obtainable from combining one or more selected raw data items from the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, and average ACC usage event data. Such hybrid event data can be processed through the trained neural network (stored in memory 640) by the controller 600 to carry out the operation of blocks 520 and 530 of FIG. 5, for example. On-board or external map and/or environmental condition data may be added to the sensor measurements to improve prediction. For instance, current fuel consumption may be combined with map data showing a mountainous area ahead to predict that the vehicle is likely to run out of fuel. Another example is combining the measurements showing a somewhat fatigued driver with environmental conditions (e.g. snowstorm, low friction roads) ahead to predict the driver's insufficiency to meet the upcoming driving conditions. The combination of upcoming surroundings data together with the current driver state places the driver into context and produces better predictions.

The vehicle controller 600 of FIG. 6 is suitable for executing embodiments of one or more software systems or modules that perform vehicle brake strategies and vehicle braking control methods according to the subject application. The example vehicle controller 600 may include a bus or other communication mechanism for communicating information, and a processor 630 coupled with the bus for processing information. The computer system includes a main memory 640, such as random access memory (RAM) or other dynamic storage device for storing instructions and loaded portions of the trained neural network to be executed by the processor 630, and read only memory (ROM) or other static storage device for storing the complete trained neural network and other static information and instructions for the processor 630. Other storage devices may also suitably be provided for storing information and instructions as necessary or desired.

Instructions may be read into the main memory 640 from another computer-readable medium, such as another storage device of via the transceiver 650. Execution of the sequences of instructions contained in main memory 640 causes the processor 630 to perform the process steps described herein. In an alternative implementation, hard-wired circuitry may be used in place of or in combination with software instructions to implement the invention. Thus implementations of the example embodiments are not limited to any specific combination of hardware circuitry and software.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

The term "backend server" means a functionally-related group of electrical components, such as a computer system that may or may not be connected to a network and which may include both hardware and software components, or alternatively only the software components that, when executed, carry out certain functions. The "backend server" may be further integrated with a database management system and one or more associated databases.

In accordance with the descriptions herein, the term "computer readable medium," as used herein, refers to any non-transitory media that participates in providing instructions to the processor 630 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic," as used herein, with respect to FIG. 6, includes hardware, firmware, software in execution on a machine, and/or combinations of each to perform a function (s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

While the foregoing disclosure has been set forth in terms of implementing one or more aspects of the invention using a neural network or other pattern recognition algorithm, it should equally be appreciated that other classifier types may be used, such as support vector machines, boosted ensembles, etc.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A data collection and processing device in a vehicle configured to provide predicted vehicular event warning and/or evasion, the device comprising:
   at least one of a plurality of sensors and a signal interface to the plurality of sensors;
   a memory configured to store a plurality of instructions and a pre-trained pattern recognition algorithm; and
   a processor, coupled to the plurality of sensors via the signal interface and to the memory, wherein the processor is configured to execute the plurality of instructions to:
      receive real-time data from the plurality of sensors relating to at least one of a current vehicle condition and a current driver condition,
      predict, by processing at least a portion of the real-time data through the pre-trained pattern recognition algorithm, a likelihood that a predefined vehicle event from among a plurality of predefined vehicle events will occur,
         wherein the pre-trained pattern recognition algorithm comprises a pattern recognition module that is trained to predict the likelihood that the predefined vehicle event will occur using: (a) previously-collected event data, which corresponds to data that characterizes prior occurrences of the predefined vehicle event, and (b) previously-collected interval data, which corresponds to data collected at predetermined time intervals preceding the predefined vehicle event,
         wherein the event data is collected in response to detecting the predefined vehicle event, whereas the interval data is collected at the predetermined time intervals independent of detecting the prior occurrences of the predefined vehicle event, and
         wherein the pre-trained pattern recognition algorithm predicts the likelihood that the predefined event from among the plurality of vehicle events will occur via pattern matching the real-time data to the previously-collected interval data,
      output a first warning type if the likelihood is predicted to be above a first threshold but not above a second threshold, and output a second warning type and/or conducting a vehicle evasive maneuver if the likelihood is predicted to be above the second threshold.

2. The device of claim 1, wherein the previously-collected event data is collected over a predetermined window of time that corresponds to a time of the prior occurrence of the at least one predefined vehicle event.

3. The device of claim 1, wherein at least one of the previously-collected event data and previously-collected interval data is collected from a plurality of vehicles driven by a plurality of drivers.

4. The device of claim 1, wherein the pre-trained pattern recognition algorithm is configured to perform a pattern recognition operation on the received real-time data using a set of target values corresponding to the at least one predefined vehicle event.

5. The device of claim 1, wherein the second warning type comprises at least one of (i) illuminating a symbol on a display panel in a more pronounced manner than in the case of the first warning type, (ii) outputting an audible sound from a speaker of the vehicle in a more pronounced manner than in the case of the first warning type, and (iii) providing a haptic warning.

6. The device of claim 1, wherein conducting the vehicle evasive maneuver comprising at least one of (i) controlling a brake pedal or braking system of the vehicle to avoid or mitigate the predicted at least one predefined vehicle event, (ii) controlling a steering wheel and/or steering system of the vehicle to avoid or mitigate the predicted at least one predefined vehicle event, and (iii) controlling a vehicle throttle, accelerator pedal or steering angle to avoid or mitigate the predicted at least one predefined vehicle event.

7. The device of claim 1, wherein the pre-trained pattern recognition algorithm is ported to the memory of the device from a backend server after undergoing a database reduction operation.

8. The device of claim 1, wherein the real-time data further comprises real-time data relating to at least one of environmental conditions and driving conditions.

9. A method for providing predicted vehicular event warning and evasion in a vehicle, the method comprising:
receiving, by a data collection and processing device in a vehicle from a plurality of sensors, real-time data relating to at least one of a current vehicle condition and a current driver condition;
predicting, by processing at least a portion of the real-time data through a pre-trained pattern recognition algorithm stored in a memory of the vehicle, a likelihood that a predefined vehicle event from among a plurality of predefined vehicle events will occur,
wherein the pre-trained pattern recognition algorithm comprises a pattern recognition module that is trained to predict the likelihood that the predefined vehicle event will occur using: (a) previously-collected event data, which corresponds to data that characterizes prior occurrences of the predefined vehicle event, and (b) previously-collected interval data, which corresponds to data collected at predetermined time intervals preceding and the predefined vehicle event,
wherein the event data is collected in response to detecting the predefined vehicle event, whereas the interval data is collected at the predetermined time intervals independent of detecting the prior occurrences of the predefined vehicle event, and
wherein said predicting is via pattern matching the real-time data to the previously-collected interval data; and
outputting a first warning type if the likelihood is predicted to be above a first threshold but not above a second threshold; and
outputting a second warning type and/or conducting a vehicle evasive maneuver if the likelihood is predicted to be above the second threshold.

10. The method of claim 9, wherein the previously-collected event data is collected over a predetermined window of time that corresponds to a time of the prior occurrence of the at least one predefined vehicle event.

11. The method of claim 9, wherein at least one of the previously-collected event data and previously-collected interval data is collected from a plurality of vehicles driven by a plurality of drivers.

12. The method of claim 9, further comprising performing, by the pre-trained pattern recognition algorithm, a pattern recognition operation on the received real-time data using a set of target values corresponding to the at least one predefined vehicle event.

13. The method of claim 9, wherein the second warning type comprises at least one of (i) illuminating a symbol on a display panel in a more pronounced manner than in the case of the first warning type, (ii) outputting an audible sound from a speaker of the vehicle in a more pronounced manner than in the case of the first warning type, and (iii) providing a haptic warning.

14. The method of claim 9, wherein conducting the vehicle evasive maneuver comprising at least one of (i) controlling a brake pedal or braking system of the vehicle to avoid or mitigate the predicted at least one predefined vehicle event, (ii) controlling a steering wheel and/or steering system of the vehicle to avoid or mitigate the predicted at least one predefined vehicle event, and (iii) controlling a vehicle throttle or accelerator pedal to avoid or mitigate the predicted at least one predefined vehicle event.

15. The method of claim 9, further comprising porting the pre-trained pattern recognition algorithm to a memory of the data collection and processing device from a backend server after undergoing a database reduction operation.

16. The method of claim 9, wherein the real-time data further comprises real-time data relating to at least one of environmental conditions and driving conditions.

* * * * *